(No Model.) 2 Sheets—Sheet 1.
G. F. FISCHER.
RAKE ATTACHMENT FOR WAGONS.
No. 497,172. Patented May 9, 1893.
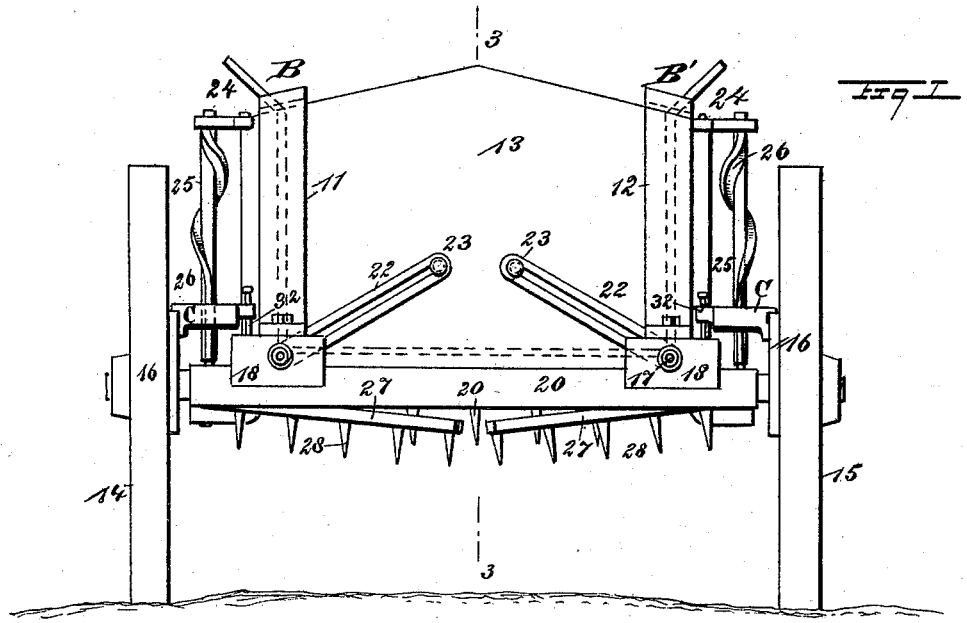
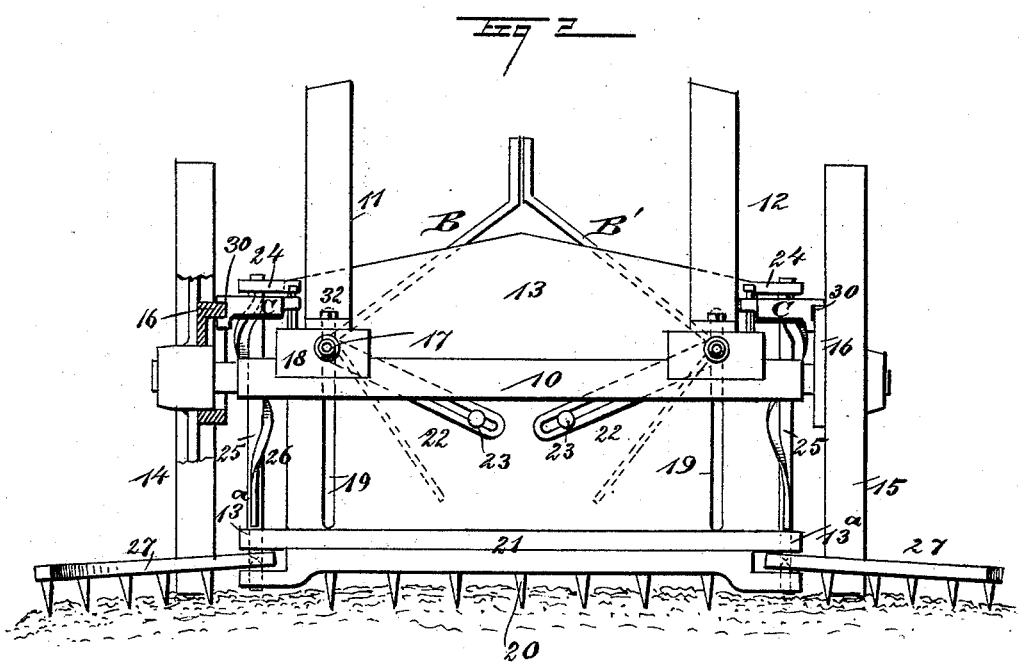
WITNESSES:
INVENTOR
G. F. Fischer
BY
Munn & Co.
ATTORNEYS.

(No Model.) 2 Sheets—Sheet 2.
G. F. FISCHER.
RAKE ATTACHMENT FOR WAGONS.
No. 497,172. Patented May 9, 1893.
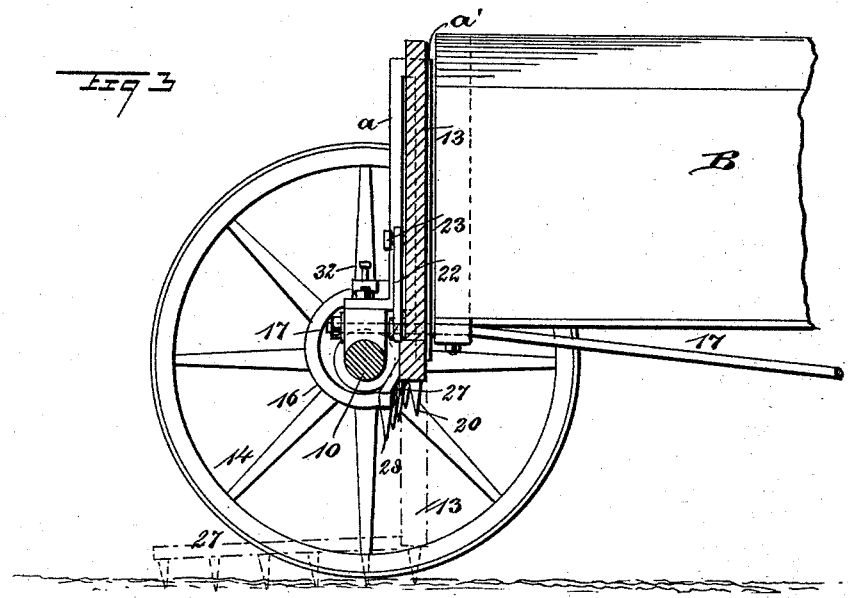
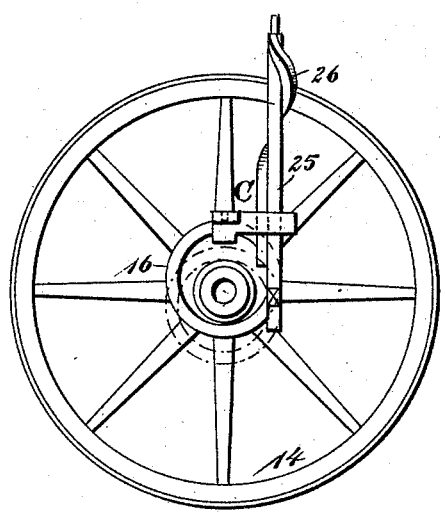
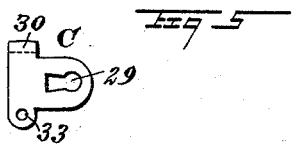
WITNESSES:
H. Walker
C. Sedgwick
INVENTOR
G. F. Fischer
BY Munn & Co
ATTORNEYS.

UNITED STATES PATENT OFFICE.

GEORGE F. FISCHER, OF ROCHESTER, NEW YORK.

RAKE ATTACHMENT FOR WAGONS.

SPECIFICATION forming part of Letters Patent No. 497,172, dated May 9, 1893.

Application filed September 19, 1892. Serial No. 446,304. (No model.)

*To all whom it may concern:*

Be it known that I, GEORGE FRANCIS FISCHER, of Rochester, in the county of Monroe and State of New York, have invented a new and Improved Rake Attachment for Wagons, of which the following is a full, clear, and exact description.

My invention relates to a rake attachment for wagons, especially dump wagons, and it has for its object to provide a means whereby dirt, gravel, or other material of like character may be readily and expeditiously lifted and distributed over a large area when such material is dumped or dropped from a wagon or other vehicle.

Another object of the invention is to provide a rake attachment at the rear of the vehicle, which when the load is dumped therefrom will automatically act to rake over the surface upon which the material carried by the vehicle is dropped, and whereby when the body of the vehicle is brought to a carrying position the rake will be restored to an upper or to its normal position.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is an end view of the dumping vehicle having the improvement applied thereto, the rakes being shown in their upper or normal position. Fig. 2 is a view similar to Fig. 1, but the rakes are illustrated in their lower or working position. Fig. 3 is a section taken vertically through the rear of the vehicle and practically on the line 3—3 of Fig. 1. Fig. 4 is a view of the inner side of one of the wheels, illustrating the connection between said wheels and the driving mechanism of the rakes; and Fig. 5 is a plan view of a detail of construction hereinafter more fully described.

This invention is especially applicable to that class of wagons in which the load is dumped from the bottom of the body, and the body of the vehicle shown in the drawings is substantially the same as that illustrated in an application for Letters Patent filed by myself the 30th day of July, 1892, Serial No. 441,678.

Upon the rear axle 10 of the vehicle, two guides 11 and 12, are located, which guides extend vertically upward from the axle, and are located one between the center and each end of the axle. The guides, as shown in Fig. 3, preferably comprise two members spaced some distance apart and united at the top, the members being separated at the bottom. The outer member $a$ of each guide is securely attached to the axle, while the inner member $a'$, extends downward parallel with the outer member forward of the axle; and as heretofore stated, the two members are connected at their upper ends. These guides are adapted to receive the ends of a tail board 13, and the tail board is adapted to have pivotal movement in said guides. The supporting wheels 14 and 15, mounted upon the axle 10, are each provided upon the inner face with an eccentrically located circular flange 16, as shown best in Fig. 4, the flange being eccentrically located with respect to the hub. The body of the vehicle shown in the drawings is made in two longitudinal sections B and B', which sections are practically L-shaped in cross section, one member of each section constituting a portion of the bottom of the body and the other member a portion of its sides. The sections of the body are mounted to turn upon truss rods 17, which are preferably passed through blocks 18, mounted upon the axle; and these truss rods consequently pass through the lower ends of the guides 11 and 12, and therefore must pass through the tail board 13. The tail board is provided with vertical slots 19 to accommodate these truss rods, and these slots are concealed when the tail board is in its upper position by means of the guides 11 and 12.

Upon the lower end of the tail board a series of teeth 20, is secured, which teeth are adapted for raking purposes; and in order that the teeth may be securely fastened in the tail board, the lower portion is made heavier or thicker than the upper portion, as shown at 21 in Fig. 2; but if in practice it is found desirable the lower portion of the tail board may be made no thicker than the remaining portion, and the teeth may be attached to the tail board in such manner that they may be readily removed.

The lower portion of the tail board extends out beyond the sides of the body and these extensions of the board are designated as 13ª. The upward and downward movement of the tail board is preferably regulated by the movement of the body of the vehicle; and to that end upon each truss rod one end of a link 22, is pivotally attached; and these links are carried upward diagonally across the face of the tail board, preferably the outer face, to a point at each side of the vertical center of the board, and pins 23, are thereupon passed through the links, attaching them to the board, as shown best in Fig. 1.

From each side of the upper portion of the tail board a bracket 24, is projected; and in the upper end of each of these brackets the upper portion of a shaft 25, is mounted to turn. Each shaft 25, is made straight or practically so, at its upper and at its lower end, especially at the latter end, and a thread 26, is spirally produced upon the body portion of each of the shafts, the thread having a long outside pitch. Upon the lower end of each shaft 25, the inner end of a rake head 27, is secured, and these rake heads are provided with teeth 28, of any approved pattern. In connection with each shaft 25, a reciprocating block C, is employed, which block is illustrated in plan view in Fig. 5. The upper face of the block is provided with a key-hole slot 29, and through this slot the shaft and its thread in connection with which the block is to be used, are passed. At one end of the block a jaw 30 is formed, and as shown in Fig. 2, the jaw of each of the blocks receives the cam ring or flange 16, and the said jaws are adapted to always remain in engagement with the cams. Thus it will be observed that each reciprocating block is not only mounted upon a shaft 25 but it is also in engagement with one of the cams 16; and in order that the blocks may be steady, pins 32, are passed through an aperture 33 in the inner ends of the blocks and into the axle or the axle blocks 18; but any desired mechanism capable of use in steadying the blocks may be substituted for the pin.

When the tail board is in its upper position, as shown in Fig. 1, the rakes 27, are folded inward beneath the axle; and as the vehicle is drawn along, the rotation of the wheels will cause the blocks C to vertically reciprocate; and as these blocks are at this time upon the lower plain portion of the shafts 25 they move freely on said shafts but do not tend to revolve them; but when the load is dumped the downward movement of the body of the vehicle forces the tail board downward also, until the teeth 20 upon its lower edge engage with the material that has been dumped; and while the tail board is being dropped the threads of the shafts 25, are drawn through the reciprocating blocks C, and the rake heads 27, carried by these shafts are thrown outward back of the rear wheels and diagonally across them, as shown in Fig. 2; and as the vehicle is drawn forward over the material dumped, and the reciprocating blocks being moved alternately upward and downward and engaging as they do at that time with the threaded surfaces of the shafts 25, rock the said shafts, and therefore the rake heads 27 are carried from their outer position to the center of the tail board, and then from that point to their outer position again, each one describing an arc of a circle.

In this construction it is obvious that gravel, sand, hay, manure, or any material of that character, may be expeditiously, conveniently and effectively spread over a large area of surface automatically, the work being done by the vehicle and the team. When the body is restored to its carrying position, the tail board is carried upward also, and the rake heads 27 are carried inward to their normal position beneath the axle.

The tail board levels the dirt or other material as it is dumped or dropped from a wagon or vehicle. It is to be employed as a leveler, in all cases when desired to be used separately, and therefore may be regarded as a fixed portion of the wagon. The rakes serve merely as an auxiliary thereto, and are to be used only when neat and clean work is desired, and to give a finished appearance to a field, lot, roadway, the grade of a railway, or other work for which it is especially adapted and designed.

I desire it to be distinctly understood that while it is preferred to connect the tail board with the dumping mechanism of the vehicle and to have them work in unison, the tail board may be tripped by hand if in practice it is found more convenient; and I further desire it to be understood that the operative mechanism, as for example the links 22, may be contained within the tail board, but in that event the tail board is made double. It may be further mentioned that any material found in practice to be most advantageous may be utilized in the construction of the device.

Having thus described my invention, I claim as new and desire to secure by Letters Patent—

1. In a dumping vehicle, a shaft actuated by the movement of the tail board, and a rake head attached to the shaft, substantially as shown and described.

2. In a dumping vehicle, of the character described, a vertically sliding tail board having a raking surface, substantially as and for the purposes specified.

3. A tail board provided with rakes and mechanism for reciprocating the rakes, substantially as shown and described.

4. A vertically sliding tail board having rake teeth secured to its lower end, substantially as shown and described.

5. The combination, with a tail board, of shafts located at the sides thereof, rake heads attached to the shafts, and a driving mechanism connected with the shafts and operated